United States Patent
Hayward et al.

[11] Patent Number: 5,899,392
[45] Date of Patent: May 4, 1999

[54] DECONTAMINATION OF RPET THROUGH PARTICLE SIZE REDUCTION

[75] Inventors: Donald W. Hayward, Waterville; Alison S. Martin, Maumee; Francis M. Schloss, Perrysburg, all of Ohio

[73] Assignee: Plastic Technologies, Inc., Holland, Ohio

[21] Appl. No.: 08/746,478

[22] Filed: Nov. 12, 1996

[51] Int. Cl.⁶ .......................... B02C 19/00; B02C 19/12
[52] U.S. Cl. ............................. 241/17; 241/19; 241/20; 241/23; 241/24.28
[58] Field of Search ................. 241/17, 19, 20, 241/23, 24.28, 79.1, DIG. 38

[56] References Cited

U.S. PATENT DOCUMENTS

| | | | |
|---|---|---|---|
| 4,392,804 | 7/1983 | Pushee et al. | |
| 4,602,046 | 7/1986 | Buster et al. | |
| 4,830,188 | 5/1989 | Hannigan et al. | 209/3 |
| 5,011,087 | 4/1991 | Richardson et al. | 241/5 |
| 5,102,594 | 4/1992 | Hayward et al. | |
| 5,143,308 | 9/1992 | Hally et al. | 241/76 |
| 5,148,993 | 9/1992 | Kashiwagi | 241/24 |
| 5,255,859 | 10/1993 | Peacock et al. | 241/79.1 |
| 5,361,994 | 11/1994 | Holloway | 241/23 |
| 5,375,778 | 12/1994 | Lundquist | 241/24 |
| 5,443,652 | 8/1995 | Scarola et al. | 241/DIG. 38 X |
| 5,688,693 | 11/1997 | Fine et al. | 241/DIG. 38 X |

*Primary Examiner*—John M. Husar
*Attorney, Agent, or Firm*—Donald R. Fraser

[57] ABSTRACT

Contaminants are removed from RPET flakes by a process which includes the steps of comminuting the RPET flakes to produce RPET particles and driving the contaminants out from the RPET particles.

6 Claims, 1 Drawing Sheet

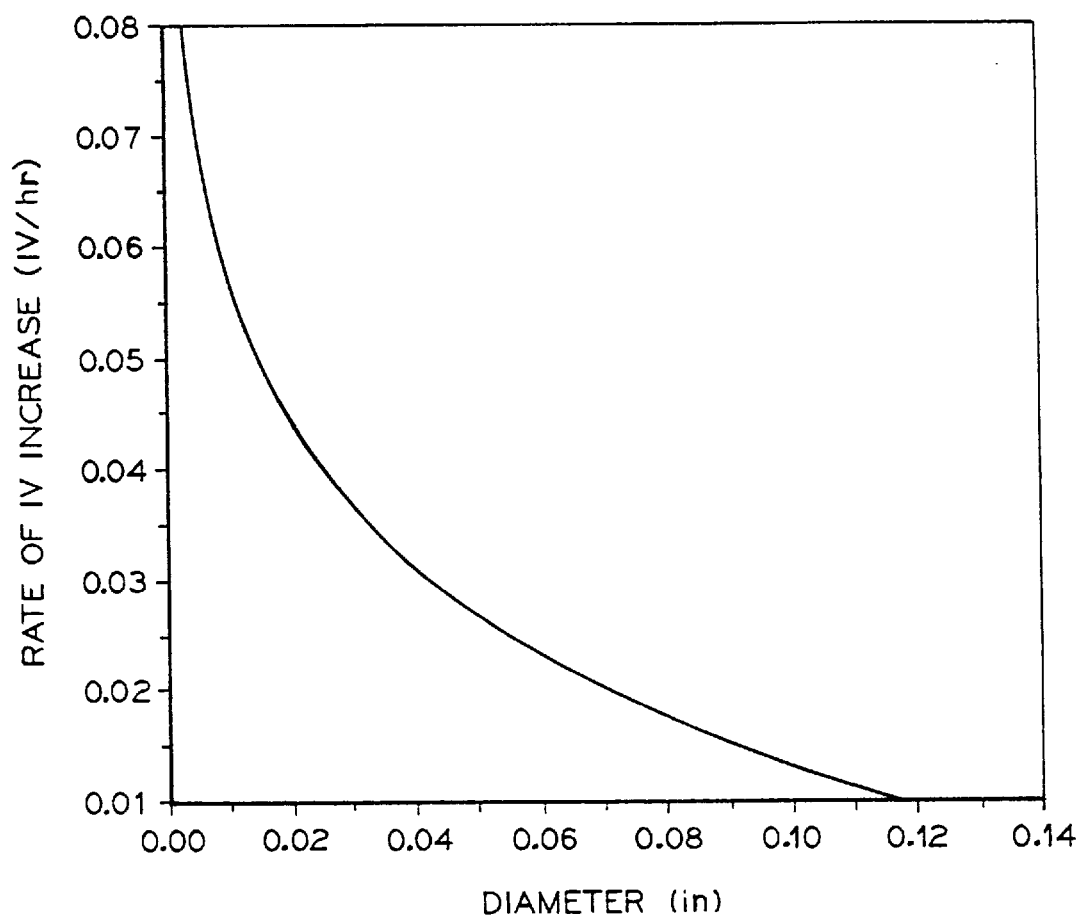

5,899,392

DECONTAMINATION OF RPET THROUGH PARTICLE SIZE REDUCTION

FIELD OF THE INVENTION

This invention relates generally to an improved process for decontaminating recycled polyethylene terephthalate (RPET) through particle size reduction. More particularly, the invention is directed to a process for removing contaminants which have diffused into the matrix of the sidewalls of a PET container, which process is conducted after the container is recycled into RPET.

BACKGROUND OF THE INVENTION

Post-consumer processing of recycled PET to manufacture a variety of useful consumer products such as flower pots and fence posts is well-known. Typically, the recycling process utilizes used PET containers, such as discarded carbonated beverage containers, which are collected, sorted, washed, and separated from contaminants to yield a relatively clean source of RPET. Additionally, the manufacture of imperfect and damaged molded PET products, particularly the blow molded bottles for use in containing consumer goods, results in a considerable amount of PET waste which the manufacturers of such products would like to reuse. The RPET produced by conventional recycling processes is generally in ground or flake form, which is thereafter melt processed or further pelletized by the end user.

RPET is always subjected to a grinding operation in order to make the material easier to handle and process. Conventional grinding equipment reduces the RPET to about ⅜ inch particles or flakes. The grinding is conducted in a manner to insure that a consistent flake size will be produced, by employing a grate or screen through which the ground material must pass upon exiting the grinder. Although conventional RPET flakes melt processing and pelletizing equipment is designed to handle ⅜ inch flakes, some RPET materials having sizes as large as ½ inch and as small as ¼ inch are also commercially produced. The bulk density of ⅜ inch flake RPET generally ranges from about 22 to about 35 pounds per cubic foot.

Similarly, RPET and PET pellets are generally formed to a standard, uniform size about 0.12 inch in diameter. The bulk density of such pellets generally ranges from about 50 to about 58 pounds per cubic foot. Typically, PET and RPET melt processing equipment is designed to accept pellets having the above mentioned dimensions and physical characteristics.

The critical aspect for achieving consistently high quality end products utilizing RPET is comprehensive decontamination of the RPET flakes or pellets. Significant decontamination occurs during the washing and sorting of PET scrap. The incoming PET bottles and containers are comminuted to form PET fragments and to remove loose labels, dirt, and other adhered foreign particles. Thereafter, the mixture is air classified and the remaining fragments are washed in a hot detergent solution to remove additional label fragments and adhesives from the PET fragments. The washed PET fragments are then rinsed and placed in a series of flotation baths where heavier and lighter weight foreign particles are removed. The remaining PET fragments are then dried and sold as RPET flakes. Thus, label and basecup glues, polyolefins, PVC, paper, glass, and metals, all of which adversely affect the quality and performance of the finished product, are removed from the RPET.

Of recent concern are the toxic contaminants which may be introduced into a typical RPET processing stream. Examples of such contaminants include pesticides, solvents, herbicides, and chlorinated hydrocarbons which could contaminate the RPET through incidental, inadvertent contact during processing or transporting same, or by the recycling of PET bottles and containers which were used by consumers to hold toxic substances for some extended period of time.

D. W. Hayward, "Employing RPET in Your Process," SPE RETEC, Nov. 4, 1994 reports that "clean" RPET flakes can still contain residual contaminants in concentrations as high as 4%, and there is a likelihood that such contaminants would include toxic contaminants. These sources of contamination are appropriately of great concern to those who desire to incorporate RPET into new containers for food-contact use.

With regard to the possibility that toxic contaminants could be contained in RPET designed for food-contact use, the U.S. FDA has set protocols for the levels of such contaminants in these applications, and has established surrogate and concentration limits to establish the effectiveness of washing and subsequent decontamination processes. Because the U.S. FDA protocols require that the RPET be introduced to the selected contaminant for as long as two weeks, it is clear that contaminants will diffuse into the polymer matrix of a bottle or container sidewall that is subsequently recycled. Accordingly, an effective decontamination method will to some extent require that the contaminant be driven back out of the RPET flakes produced from the bottle or container sidewalls, in order to meet the required contaminant concentration limit.

It would be desirable to develop a process for decontaminating RPET to produce "clean" RPET, wherein the clean RPET would exhibit a residual contaminant level which would make it acceptable for manufacturing new food-grade PET bottles and containers.

SUMMARY OF THE INVENTION

Accordant with the present invention, a process for removing contaminants from RPET flakes has surprisingly been discovered. The process comprises the steps of:

comminuting the RPET flakes, to prepare RPET particles having an average mean particle size from about 0.005 inch to about 0.1 inch in diameter; and driving the contaminant out of the RPET particles.

The inventive process is particularly useful for removing toxic contaminants from RPET flakes, so that the resultant material may then be utilized to manufacture new food-grade PET bottles and containers.

BRIEF DESCRIPTION OF THE DRAWING

The novel features considered characteristic of the present invention are set forth with particularity in the appended claims. The invention itself, however, will best be understood from the accompanying description of specific embodiments when read in connection with the attendant drawing in which:

The FIGURE is a graph illustrating the rate of intrinsic viscosity increase as a function of decreasing RPET particle size.

DETAILED DESCRIPTION OF THE PREFERRED EMBODIMENT

The present invention is directed to a process for removing contaminants from RPET flakes. The RPET flakes are comminuted to prepare RPET particles and thereafter the contaminant is driven out of the RPET particles. By the term "RPET flakes" as it is used herein is meant generally the commercially available recycled polyethylene terephthalate materials produced by conventional PET recycling methods, usually in flake form, but which may additionally be in the form of chunks, spheres, pellets, and the like, and which are generally made available in bulk in a substantially uniform particle size from about ¼ inch to about ½ inch for subsequent melt processing operations.

A typical single particle of ⅜ inch RPET flake exhibits a surface to volume ratio of about 177. Contaminants which have penetrated the RPET flake matrix can only diffuse out at the surface of the RPET flake. Contaminants which have diffused far into the RPET flake matrix generally cannot diffuse out of the flake between the time the RPET flake is produced in the conventional recycling process and the time the RPET flake is utilized in a melt processing operation for producing a new PET article.

According to the present invention, RPET flakes are comminuted by any conventional means to prepare RPET particles having an average mean particle size from about 0.005 inch to about 0.1 inch in diameter. Preferably, the particle size ranges from about 0.005 inch to about 0.05 inch. This is a substantial reduction in the size of the individual RPET flakes, and will allow any contaminant contained within the RPET flakes to be driven out more easily and quickly. For example, a particle of PET having a radius of about 0.058 inch and a concentration of benzene of about 25,000 ppm requires over 96 hours of diffusion time at 70° for the level of benzene to fall to a concentration of about 0.25 ppm. By contrast, a particle of PET having a radius of about 0.00876 inch requires less than 3 hours to reach the same 0.25 ppm concentration level, all other parameters being equal. Thus, RPET flakes may be decontaminated by the inventive process, which includes the step of particle size reduction, without the need for elaborate or exotic means such as twin-screw compounding, vacuum extraction, or extremely long residence times such as are taught in the prior art.

Following comminution of the RPET flakes, the resultant RPET particles are subjected to a process designed to drive the contaminants out of the particles. As is well-known, this may be accomplished by merely air drying the RPET particles (passing a stream of a gas, preferably air, over and through the particles) at room temperature. The time required to achieve the substantial elimination of contaminants from the RPET particles is much less than the time that otherwise would be required to achieve the same elimination of contaminants from an equal mass of RPET flakes, utilizing the same conditions. Alternatively, the comminuted RPET particles may simply be allowed to reside in bulk at standard conditions until the contaminants have diffused out of the particles. Moreover, the RPET particles may be heated in a conventional manner which will accelerate the diffusion of the contaminants out from the particles. Also, the RPET particles may be placed in a liquid solution that can leach the contaminants out from the particles. These, as well as other conventional methods may be used to drive the contaminants out from the RPET particles; but in each case, the time required will be substantially less than would otherwise be required to effect the same level of decontamination upon an equal mass of RPET flakes.

Although the present invention focuses primarily upon the use of particle size reduction to decontaminate the RPET particles, other benefits may be realized from employing the particle size reduction step. The same mechanics will also improve the drying performance and solid-stating of the RPET.

Solid-stating is a process whereby the intrinsic viscosity of the RPET is raised. Intrinsic viscosity is an important physical characteristic which in large part determines the ultimate strength of the final product, for example, a bottle or container produced from the RPET flakes. A bottle or container produced from RPET having a low intrinsic viscosity will not perform as well as a bottle or container made from higher intrinsic viscosity RPET.

PET, unlike most other polymers, has the ability to be "put back together" in the solid-stating process, which raises the intrinsic viscosity back up to an acceptable level. Solid-stating occurs at high temperatures, often just below the melting point of the polymer, and employs a dry gas stream flowing through the bed of polymer particles, where the gas employed is usually inert, such as nitrogen. Alternatively, the solid-stating process can be carried out under a vacuum. Solid-stating depends on diffusion mechanics to remove by-products of the process, and thermal dynamics to raise the temperature of the RPET. Reduced particle size greatly improves the solid-stating process by decreasing the time required to raise the intrinsic viscosity to the desired level.

Furthermore, PET is a hygroscopic polymer that must be thoroughly dried prior to melt processing in order to prevent hydrolytic degradation and the resultant loss of intrinsic viscosity. Drying of PET and RPET flakes usually occurs in commercially available desiccant hot air dryers which are designed to remove moisture from the surface and matrix of the material. Drying is conducted at temperatures which are above the boiling point of water but well below solid-stating temperatures. Particle size reduction, according to the present invention, greatly reduces the time required to dry the RPET.

Thus, although the inventive process is described and claimed as one for removing a contaminant from RPET flakes, it is contemplated that the described and claimed process may additionally be employed to improve and accelerate a solid-stating process, and may simplify and accelerate a process for drying the RPET.

EXAMPLE

RPET flakes are comminuted to produce four lots of RPET particles having approximately the following average mean particle sizes (diameters): 0.12 inch (RPET flakes, not comminuted); 0.0394 inch; 0.0165 inch; and 0.007 inch. These four lots of RPET flakes and particles are individually solid-stated at a temperature of about 218° C. under a nitrogen purge at 1 atm. Samples of each lot are extracted at various times during the solid-stating process, and the intrinsic viscosity of each sample is measured. It is observed that the intrinsic viscosities of the samples taken from a single lot increase for increasingly longer solid-stating times. Furthermore, it is also observed that the rate of increase in intrinsic viscosity depends upon the average mean particle size of the RPET particles in the lot. The rate of increase in intrinsic viscosity increases for increasingly smaller RPET particle sizes, as illustrated in accompanying drawing.

The process for removing contaminants from RPET flakes described hereinabove is generally disclosed in terms of its broadest application to the practice of the present invention. Occasionally, the process conditions as described may not be precisely applicable to each contaminant/RPET flake combination included within the disclosed scope. Those instances where this occurs, however, will be readily recognized by those ordinarily skilled in the art. In all such cases, the process may be successfully performed by conventional modifications to the disclosed process.

The invention is more easily comprehended by reference to specific embodiments recited hereinabove which are representative of the invention. It must be understood, however, that the specific embodiments are provided only for the purpose of illustration, and that the invention may be practiced otherwise than as specifically illustrated without department from its spirit and scope.

What is claimed is:

1. A process for removing a contaminant which has penetrated into the matrices of RPET flakes from the RPET flakes, comprising the steps of:

comminuting the RPET flakes, to prepare particles having an average mean particle size from about 0.005 inch to about 0.1 inch in diameter; and driving the contaminant out of the RPET particles by causing the contaminant to diffuse out at the surfaces of the RPET particles.

2. The process for removing a contaminant from RPET flakes according to claim 1, wherein the RPET flakes are comminuted to prepare RPET particles having an average mean particle size from about 0.005 inch to about 0.05 inch.

3. The process for removing a contaminant from RPET flakes according to claim 1, wherein the step of driving the contaminant out of the RPET particles comprises passing a stream of a gas over and through the RPET particles.

4. The process for removing a contaminant from RPET flakes according to claim 1, wherein the step of driving the contaminant out of the RPET particles comprises allowing the RPET particles to reside in bulk for a period of time sufficient for substantially all of the contaminant to diffuse out of the RPET particles.

5. The process for removing a contaminant from RPET flakes according to claim 1, wherein the step of driving the contaminant out of the RPET particles comprises heating the RPET particles.

6. The process for removing a contaminant from RPET flakes according to claim 1, wherein the step of driving the contaminant out of the RPET particles comprises immersing the RPET particles in a solution capable of leaching the contaminant out of the RPET particles.

* * * * *